United States Patent [19]
Willfurth

[11] 3,753,217
[45] Aug. 14, 1973

[54] SINGLE RECESSED BASE LIGHT

[76] Inventor: Erich Willfurth, 31 W. Chestnut St., Farmingdale, N.Y. 11735

[22] Filed: Aug. 31, 1971

[21] Appl. No.: 176,514

[52] U.S. Cl................. 240/2 W, 52/28, 240/73 BC
[51] Int. Cl......................... E04f 19/00, F21v 33/00
[58] Field of Search................. 240/2 W, 78 H, 7.3, 240/41.1, 73 BC; 248/216; 52/28; 312/242

[56] References Cited
UNITED STATES PATENTS

| | | | |
|---|---|---|---|
| 2,691,718 | 10/1954 | Bowers | 52/28 |
| 2,039,065 | 4/1936 | DeMark | 312/242 X |
| 3,375,368 | 3/1968 | Dorsky | 240/78 H |
| 3,116,884 | 1/1964 | Lowther | 240/2 W X |
| 2,389,349 | 11/1945 | Eastman | 248/216 X |
| 2,732,158 | 1/1956 | Haverlee | 248/216 |

*Primary Examiner*—Richard C. Queisser
*Assistant Examiner*—Daniel M. Yasich
*Attorney*—Carl Miller

[57] ABSTRACT

A recessed light primarily for use in a staircase to be positioned within a recess in the baseboard or wall at one side of the staircase to illuminate a tread of the staircase. There may be one such light for each tread or they may be spaced in any desired manner to illuminate selected treads. The recessed light is formed as an open housing from a section of a sheet metal reentrant face with upper and lower lips to engage the upper and lower edges of a recess into which the housing snugly fits. The lips may be secured to said recess edges by nailing or by a suitable adhesive and may also be formed with integral projecting teeth or prongs to be driven into the recess edge portions for securing the housing in place. Provided centrally of the concave face of the housing is an opening for an electric light bulb. Each end of the housing is provided with an end wall so as to completely close off the recess. The housing may also take the form of a square-shaped frame at the outer edge of the concave face, the sides of the frame forming lips engageable with the outer side edge portions of the recess into which the housing is fitted.

10 Claims, 5 Drawing Figures

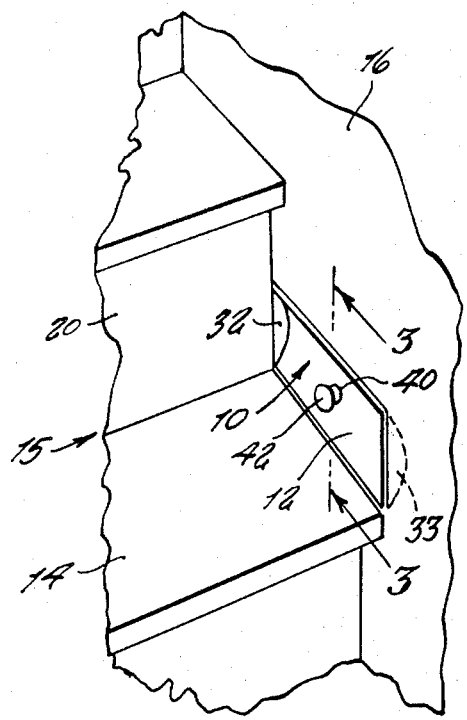
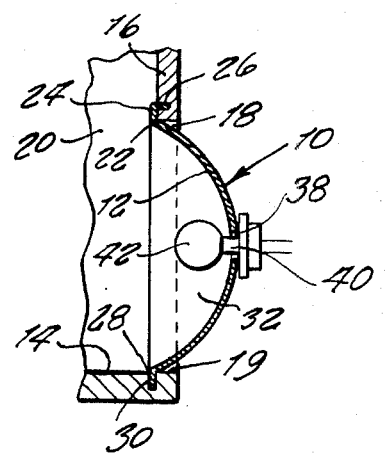
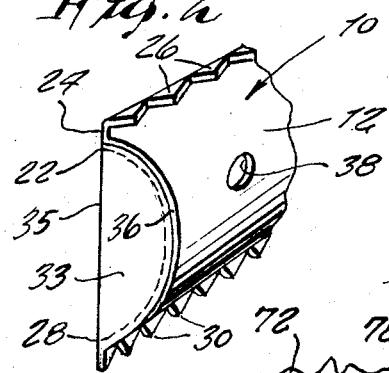
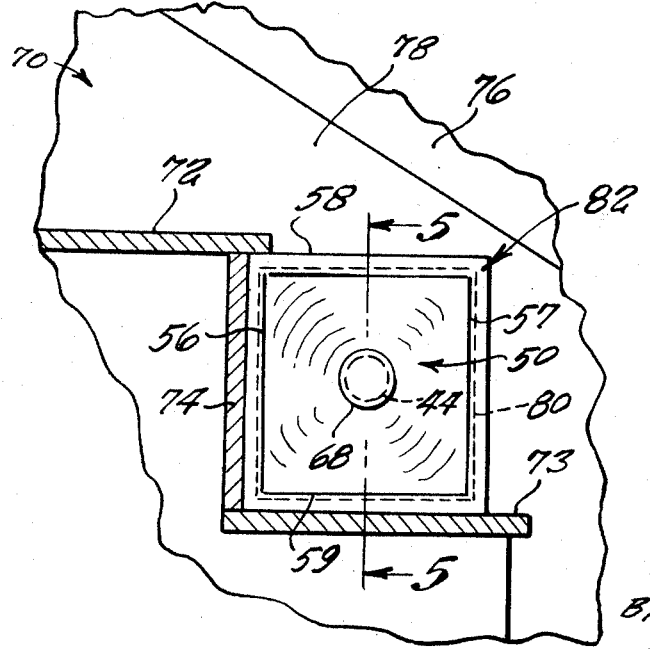
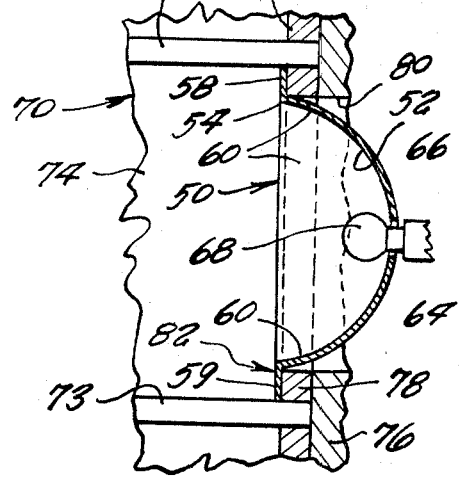

SINGLE RECESSED BASE LIGHT

This invention relates to a sheet metal housing for an electric light for use on a staircase.

The primary object of this invention is to provide a sheet metal housing of re-entrant formation to fit within and extend into a recess shaped to accommodate the same in the baseboard of a stairway such as to illuminate a tread of the stairway and at the same time lie wholly inwardly of the wall and/or baseboard at the sides of the stairway.

Another object of this invention is to form the housing from a section of a preformed re-entrant inverted sheet metal base normally used as a re-entrant baseboard at the lower end of a wall to lie inwardly of the outer surface of the wall, the wall accordingly having a dust-fall edge that is spaced from the floor, such section when used in a stairway providing a like dust-fall edge that is spaced vertically from the stair treads.

A further object of this invention is the provision of integral lips at the upper and lower horizontal edges of the inverted base section engageable with the corresponding outer edge portions of a recess provided in the stair baseboard or wall and the stair tread, the lips being adapted to be secured to such outer edge portions.

A still further object of the invention is to provide the reentrant body portion of the housing of concave formation with a central opening to receive the neck of an electric light bulb for reception in an electric light socket mounted behind the concave body portion.

Yet another object of this invention is to provide the lips of the housing with integral teeth or prongs to be driven into the surface engaged by the lips to secure the housing in place.

Another object of this invention is to provide at each end of the housing a closure wall the front edge of each wall being co-planar with the terminal edges of the lips and with the outer surface of the baseboard and/or wall.

A further object of this invention is to form the housing square or rectangular shaped with parallel vertical and horizontal sides to fit within a complementally shaped recess in the stairway baseboard and/or wall surface, with the lower horizontal side of the housing at a tread level and the inner vertical side of the housing at the outer surface of the riser above said tread, and with the upper horizontal side just below the projecting end of the tread immediately above the first mentioned tread.

Yet a still further object of this invention is to form the four sides of the housing as integral lips with the body portion of the housing re-entrant and concave, the lips being either flat to be secured by nailing or a suitable adhesive, or provided with integral projecting teeth or prongs to be driven into the surface engaged by said lips, there being also provided an opening in the concave body portion for the fitting thereinto of an electric light bulb.

Further objects of the invention will appear as the description proceeds.

To the accomplishment of the above and related objects, my invention may be embodied in the form illustrated in the accompanying drawings, attention being called to the fact, however, that the drawings are illustrative only and that changes may be made in the specific construction illustrated and described within the scope of the appended claims.

FIG. 1 shows a perspective view of the inverted base housing applied to the tread of a stairway.

FIG. 2 is a fragmentary perspective view of the inverted base housing with one of the end closure plates.

FIG. 3 is a detail vertical cross sectional view taken on line 3—3, FIG. 1.

FIG. 4 illustrates in elevation a modified form of the invention applied to the tread of a stairway.

FIG. 5 is a detail vertical cross sectional view taken on line 5—5, FIG. 4.

Referring to the drawings in greater detail there is shown in FIG. 1, a stairway light housing 10 that is formed of sheet metal that is thin, self-sustaining and flexible and actually forms a cut-off section from a strip of re-entrant inverted base used as a baseboard of the type shown and described in the above mentioned parent case of which this is a division.

The housing 10 in this instance is formed with a concave wall 12 facing outwardly of a length corresponding to the width of a tread 14 of the stairway 15. The stairway 15 has at least on one side thereof a wall 16 preferably formed of a suitable panel board such as plywood, plasterboard, sheetrock or other suitable building material. Cut into the wall 16 is a rectangular opening 18 dimensioned to snugly receive the inwardly projecting housing 10. It is to be noted that the height of the opening 18 is less than the height of the riser 20 of the stairway and that the lower horizontal side 19 of the opening 18 is in the plane of the top surface of the tread 14. The length of the opening corresponds to the width of the tread 14, as seen in FIG. 1.

Extending vertically upwardly from the horizontal outer edge 22 of concave wall 12 is an integral vertical lip 24 provided with a row of rearwardly directed teeth or prongs 26 at the free upper edge of said lip and normal thereto, see FIG. 2. Depending from the lower horizontal edge 28 of the concave wall 12 which defines in effect a lower lip, and integral therewith, is a vertical row of depending teeth or prongs 30. Each side of the housing 10 is closed by a flat sheet metal closure insert 32, 33 each having a front vertical edge 35, and a rear convex edge 36, the closure inserts 32, 33 being welded or brazed to the concave wall 12. Provided in the concave wall 12, perferably centrally therein, is an opening 38.

The light housing 10 is fitted into the wall panel opening 18 and has a snug fit therein with the opposed closure inserts 32, 33 respectively engaging the rear and front vertical sides of the opening, as seen in FIG. 1. The housing 10 is secured in place by driving the upper row of teeth or prongs 26 into the wall 16, and the lower row of teeth or prongs 30 being driven into the tread 14, see FIG. 3. An electric light bulb socket 40 is fitted into opening 38 of concave wall 12, the open end thereof projecting slightly beyond the outer surface of the concave wall 12. The bulb socket 40 is appropriately mounted either directly on the rear of the concave wall 12 or on a suitable box (not shown) supported within the wall and conductors connect the socket 40 to a source of electric supply. The socket 40 preferably should receive a high intensity low voltage light bulb 42 with the electric light source, connections, switches, etc. corresponding to the use of such.

An electric light housing 10 with an electric light as described above may be placed in the wall at every second or third tread of the stairway as may be found desirable. So placed, the recessed lights will light up the stairs thus making the same safer and thereby contribute toward the prevention of accidents. It is to be clearly understood that the above construction, shown in FIG. 1, is not restricted to use in a stairway, but is equally applicable in rooms, bathrooms, halls, nurseries, hospitals, etc., wherever it is desirable to provide a recessed light, usable at night or whenever desirable. The recessed light may be utilized with the re-entrant inverted base of the type shown in the parent case above identified by providing in the recessed and/or concave wall thereof openings such as 38 with associated bulb sockets such as 40.

It is to be noted that the light housing 10 is recessed and extends inwardly into the wall with its outer edges substantially flush with the wall surface. The concave wall 12 inhibits the gathering of dust or debris and is easily cleaned, and the light bulb 42 entirely within the housing is removed from the danger of accidental breakage, see FIG. 3. The housing 10 need not have the teeth or prongs 26, 30 to secure the same in place as the same may be disposed with and the parts of the housing engaging the sides of the wall opening and the wall and tread surfaces adjacent thereto may be secured by screws or nails.

The installation of a concave housing light unit such as 10 recessed within the wall at tread level is pleasing in appearance, simple to install, cheap and simple to manufacture, light, easy to handle and can be stacked or nested for transport and storage.

FIGS. 4 and 5 illustrate a modified form of recessed electric light housing 50 that is preferably of square foundation at its front and with the major part of its body portion or wall 52 concave both vertically and horizontally and merging into a square outer edge 54. Formed integral with the outer edge 54 along each side thereof is a laterally extending flange or lips defining rear and front vertical side lips 56, 57 and top and bottom side lips 58, 59 contributing a frame. The four lips 56, 57, 58, 59 arranged in square formation lie in the same plane and extend laterally outwardly at the outer edge portion 60 of the concave wall 52 which edge portion 60 in itself is square. Provided centrally in the concave wall 52 is an opening 64 for receiving a socket member 66 (similar to the socket 40, FIG. 1) for receiving an electric light bulb 68. The light bulb 68 may be of the high intensity low voltage type with its associated parts of socket, conductor, etc. (not shown) adapted for using such a type of light bulb.

In the fragmentary stairway 70 shown in FIG. 4, there is shown treads 72, 73 with a riser 74 therebetween. As is conventional the forward edge portion of upper tread 72 overhangs the outer surface of riser 74. Also provided in conjunction with the stairway 70 which extends along a wall 76 is a stairway baseboard 78. Cut through the baseboard 78 and wall 76 at the corner defined by tread 73 and riser 74 is a square opening 80 corresponding in dimensions to the dimensions of the square outer edge portion 60 with the outer terminal edge 54 of the concave wall 52 of the housing 50. The square opening 80 is shown in dotted lines, see FIG. 4 and in section in FIG. 5. It will be noted from FIG. 4 that the sides of the opening 80 adjacent the tread 73 and riser 74 are spaced a predetermined equal distance therefrom and respectively extend for substantially the full width of the tread and the full height of the riser. The laterally extending lips 56, 57, 58, 59 are formed of the same width and as indicated above form a frame 82. The housing 50 is inserted into the opening 80 with the outer side edge portions 60 thereof tightly engaging the sides of the opening 80 by a press fit, and with the inside surfaces of the lips forming frame 82 in abutting engagement with the outer surface of the baseboard 78, as seen in FIG. 5. The dimensions of the opening 80, concave wall 52 with outer edge portion 60 and the width of the lips of frame 82 are such that the housing 50 when placed in position within the opening 80, the lower horizontal edge of frame 82 will seat on the tread 73, the rear vertical edge of frame 82 will seat against the riser 74 and the rear portion of the upper edge of the frame 82 will seat against the under surface of tread 72 that overhangs the riser 74, all as shown in FIG. 4. This construction of the light recessed housing with relation to the baseboard, tread and riser of a stair makes for a pleasing appearance, that is highly efficient for its designed purposes, that is easy to install, requires no fastening means by virtue of its press fit in the wall opening, that is simple and cheap to manufacture, easy to handle and can be stacked or nested for transport and storage.

It is to be understood that the recessed light housing 50 of FIGS. 4 and 5 may be of different dimensions and is equally applicable for many other applications, the same as set forth above with reference to the recessed light housing 10 of FIGS. 1, 2 and 3. It may also be readily installed in existing type buildings wherever the use of such is desired. Also, if desired, the frame 82 may be provided with integral rearwardly projecting rows of teeth or prongs at each of the sides thereof for securing the housing 50 in place, if such be desired.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What I claim is:

1. In combination with a staircase and an adjacent upright wall, an electric light for a housing, the housing comprising a re-entrant inverted base for at least one stair including a tread and a riser:

a. The inverted base being of thin, stiff, flexible metal and providing:
      1. a concave back section,
      2. a lower lip section extending forwardly of said back section,
      3. a row of vertically depending prongs at the edge of said lower lip section,
      4. an upper lip section extending forwardly of said back section,
      5. a row of horizontal rearwardly directed prongs at the edge of said upper lip section,
      6. a closure plate at each end of said concave back section secured thereto with each having a vertical forward edge,
   b. an electric light bulb socket mounted rearwardly of said back section with its bulb receiving portion extending slightly forwardly of said back section through an opening therein,
   c. there being an opening in said wall at the base thereof adjacent to an end of said one stair tread to receive said inverted base, and d. said rows of upper and lower prongs respectively securing said inverted base to said wall and stair tread, whereby an electric light for the socket is recessed and will illuminate said stair tread.

2. The combination of claim 1, wherein:
a. said wall opening is rectangular,
   a-1. the length of said opening corresponding substantially to the width of said tread, and
   a-2. the height of said opening being less than the height of said riser,
b. said end closure plates being vertical and parallel, and
c. the forward vertical edges of said closure plates being substantially co-planar with the upper lip section and the depending teeth of the lower lip section, whereby said concave back section defines a recessed concave wall and with said end closure walls secured thereto at each end thereof defines the electric light housing.

3. The combination of claim 2, wherein the mounted position of said electric light housing in the wall opening:
a. the rear end closure plate will lie substantially in the plane of the outer surface of said riser, and
b. the front end closure plate will lie substantially in the plane of the forward edge of said tread.

4. The combination of claim 3, wherein:
a. the forward terminal edge portions of the electric light housing are substantially co-planar;

whereby in the mounted position of said electric light housing said forward terminal edge portions will lie substantially in the vertical plane of the outer surface of said wall.

5. The combination of claim 4, wherein:
a. said electric light socket is mounted directly on the rear side of the back section, and
b. said socket being adapted to receive a high intensity low voltage light bulb.

6. The combination of claim 4, wherein:
a. said electric light socket is mounted within said wall free of said back section, and
b. said socket being adapted to receive the bulb, being a high intensity low voltage light bulb, 7. In combination with a staircase and an adjacent upright side wall, a recessed electric light housing with a light for at least one stair including a lower tread, a riser and an upper tread having its forward portion overhanging the riser, comprising:
a. said light housing formed from sheet metal and mounted in said side wall and open at its front providing:
   a concave back wall emerging at its forward edge portion into a square formation,
   a lateral flange formed integral with the front edge of each side of the forward edge portion,
b. there being a square opening in said side wall adjacent to the end of the lower tread,
c. the sides of the opening adjacent said lower tread and said riser being equally spaced therefrom,
d. said housing secured in said side wall by press fitting into said square opening; and
e. said concave back wall being arcuate about an axis centrally therethrough that extends horizontally so that it can serve as a reflector to direct light rays from said light upon a surface of said tread.

8. The combination of claim 7, wherein:
a. said lateral flanges are of the same width and co-planar defining a square frame, and
b. in the mounted position of said housing the inside surface of said frame will engage the outer surface of said wall.

9. The combination of claim 8, wherein:
a. said concave wall is provided with a central opening therein, and
b. an electric light bulb socket mounted rearwardly of said concave wall with its bulb receiving portion extending through said central opening and projecting slightly forwardly of the concave wall at said opening.

10. The combination of claim 9, wherein:
a. said square wall opening and said forward square end of said housing are complimentally dimensioned such that the the forward square end of said housing will engage the sides of the wall opening by a pressure fit, and
b. said frame being of such a width that the edge of the lower side thereof will seat on the upper surface of the lower tread, and the edge of the rear side thereof will engage the forward surface of said riser and extend from the lower tread to the underside of the overhanging portion of the upper tread.

* * * * *